United States Patent [19]

Koontz

[11] Patent Number: 4,847,472
[45] Date of Patent: Jul. 11, 1989

[54] ENHANCED RELIABILITY DISCONTINUITY DETECTOR IN A HEATED TRANSPARENCY

[75] Inventor: Harry S. Koontz, Pittsburgh, Pa.

[73] Assignee: PPG Industries, Inc., Pittsburgh, Pa.

[21] Appl. No.: 144,154

[22] Filed: Jan. 15, 1988

[51] Int. Cl.⁴ .............................................. H05B 3/36
[52] U.S. Cl. ................................... 219/543; 219/203; 219/522
[58] Field of Search ............... 219/543, 203, 219, 345, 219/522, 541, 528, 529, 549, 522, 212

[56] References Cited

U.S. PATENT DOCUMENTS

| | | | |
|---|---|---|---|
| 3,752,348 | 8/1973 | Dickason et al. | 219/203 |
| 3,864,545 | 2/1975 | Schafer | 219/203 |
| 3,892,947 | 7/1975 | Strengholt | 219/541 |
| 3,895,213 | 7/1975 | Levin | 219/203 |
| 4,109,044 | 8/1978 | Marriott | 219/203 |
| 4,323,726 | 4/1982 | Criss et al. | 174/68.5 |
| 4,436,986 | 3/1984 | Carlson | 219/212 |
| 4,543,466 | 9/1985 | Ramus | 219/203 |
| 4,565,919 | 1/1986 | Bitter | 219/509 |
| 4,584,721 | 4/1986 | Yamamoto | 219/203 |
| 4,668,270 | 5/1987 | Ramus | 65/106 |

FOREIGN PATENT DOCUMENTS 185877  10/1963  Sweden ............................. 219/541

Primary Examiner—Teresa J. Walberg
Attorney, Agent, or Firm—Dennis G. Millman

[57] ABSTRACT

Discontinuities in an electrically heated transparency are detected by monitoring voltage differences between two areas of the heating circuit on the transparency.

8 Claims, 2 Drawing Sheets

ENHANCED RELIABILITY DISCONTINUITY DETECTOR IN A HEATED TRANSPARENCY

BACKGROUND OF THE INVENTION

This invention relates to an improvement in an electrically heated transparency such as may be employed in a vehicle to provide defrosting, deicing, or defoggng capability. In particular, the improvement is in the means to detect discontinuities in the electric circuit in the transparency.

It has been known to pass electric current through a transparent conductive coating on a transparency in order to raise the temperature of the transparency. Generally, a source of electrical potential is connected to the conductive coating by way of a pair of bus bars along opposite sides of the area of the transparency to be heated. The bus bars have low resistivity relative to the coating and are intended to distribute the current evenly over the area to be heated. The bus bars may be comprised of metallic foil strips, but in the case of glass transparencies they preferably are comprised of a metallic-ceramic frit material fused onto a surface of the transparency. A typical arangement includes bus bars configured as substantially parallel stripes on opposite sides of the heated area, with electrical leads attached to each bus bar and extending away from the opposite edges of the transparency as shown in U.S. Pat. Nos. 4,323,726 (Crias et al.) and 4,668,270 (Ramus). Locating the leads on the same side of the transparency and preferably closely adjacent to each other is advantageous for the sake of easier installation of the transparency in the vehicle and simplifying the connection with the electrical power source. Therefore, U.S. Pat. Nos. 3,895,213 (Levin) and 4,543,466 (Ramus) provide an extension of one of the bus bars around an end of the transparency so that connections to both bus bars can be made in one relatively compact area.

A crack in a heated transparency can alter the electric heating circuit in ways that can cause further damage to the transparency or have other undesirable effects. A discontinuity in the coating extending with a transverse component to the direction of current flow will increase the overall resistance of the heated area, with the result that power output increases in the unaffected areas. Not only will the heating be ineffective in the damaged area, but also the increased power in the remainder of transparency can raise temperatures to such an extent that the transparency may be thermally damaged. Excessive temperatures can extend propagation of a crack in glass or melt a plastic ply. A break in a bus bar, can radically concentrate the electric power in a smal area, depending upon the location of the break. Because of the relatively large amount of current flowing along the bus bars, a defect such as a partial break that increases the resistance of a bus bar is particularly prone to cause localized overheating in the region near the defect. This can occur at any location along the bus bars, but it is particularly serious at locations where a bus bar is carrying the full current or a major portion of the current, such as in an extension leading to a remote bus bar. At high voltage locations, arcing across an open gap in the conductive material can also occur detrimentally. Although arcing is most likely to occur at a bus bar break, it can also occur across a discontinuity in the conductive coating. Another site for potential unbalanced heating or arcing is at the junction of the bus bars with the conductive coating, where the contact may be uneven or separation may occur. Because of the additional harm that overheating or arcing can cause in the transparency when minor damage occurs, it is considered desirable to provide means to detect such an occurrence so as to trigger an alarm device or to automatically remove electrical power from the heating system.

One approach that has been proposed for detecting bus bar breaks in a heated transparency employs a thin electroconductive voltage sensor lead applied to the transparency along with the bus bars. The sensor lead parallel the extension of the upper bus bar along one side of a windshield and contacts the bus bar system at the upper corner where the upper bus bar and the extension meet. External circuitry is provided to detect a voltage change along the extension evidencing a discontinuity in the extension. This approach is limited to detecting breaks in only the extension portion of the bus bars, and although breaks there may have serious consequences, it would be desirable to detect breaks at other locations as well, including the entire bus bar system, the coating, and the contact of the bus bars with the coating.

Additionally, arrangements that rely on detecting voltage changes are susceptible to false alarms due to fluctuations in the applied voltage due to varying loads on the power supply by other accessories. Accommodating the detection system to these fluctuations renders the system less sensitive to discontinuities in the heating circuit. It would be desirable to provide a detection system that is not affected by extraneous voltage fluctuations.

SUMMARY OF THE INVENTION

In the present invention, an improvement in discontinuity detection for electrically heated transparencies is provided wherein a discontinuity at any location of the heating circuit carried on the transparency, including the coating, can be detected. Moreover, the detection system is not affected by external fluctuations in the voltage. This is accomplished by applying electric power to the transparency in two separate areas, measuring voltage differences between the two areas, and generating an alarm signal when the measured difference exceeds a predetermined level. The separate areas may be established by a gap or increased resistance segment in a bus bar in one or both sides of the transparency. Optionally, a more complete separation can be provided by dividing the coating into two electrically isolated areas.

The invention will be understood more fully from the detailed description of specific embodiments which follows and the accompanying drawings.

THE DRAWINGS

DETAILED DESCRIPTION

The description of the preferred embodiment herein is in reference to a laminated transparency comprised of two plies of glass bonded together by an interlayer of plastic since that is the typical windshield construction. But it should be understood that the invention can apply to heated transparencies involving a single ply of glass with a single ply of plastic, all plastic laminations, and other combinations involving numerous plies. The transparency need not be intended for use as an autombile windshield, but may be any window for a vehicle or other enclosure, including aircraft.

Figure 1:
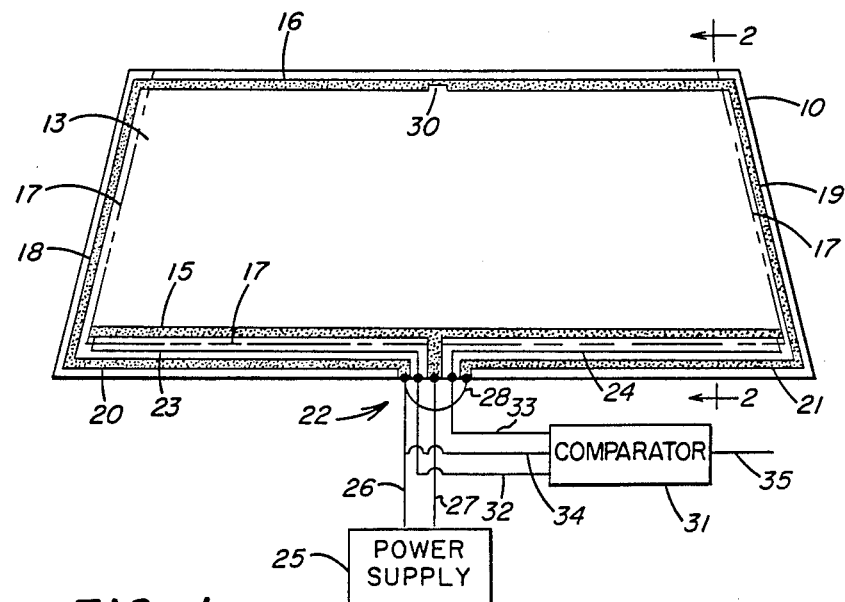
FIG. 1 is a schematic depiction of a heated transparency incorporating an embodiment of the present invention in connection with a bus bar arrangement that includes two separate heating zones with means to detect voltage differences between the two zones.
Figure 2:
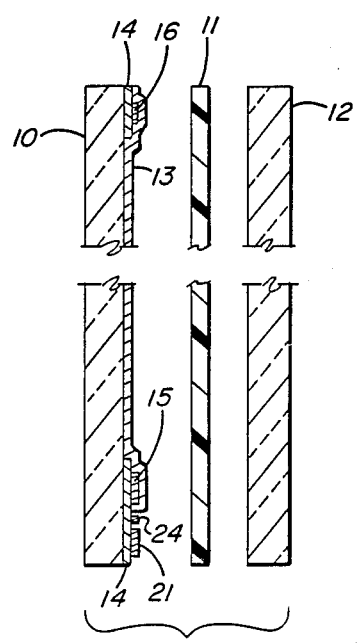
FIG. 2 is an exploded, cross-sectional, enlarged view of a typical laminated windshield construction as may be incorporated in the embodiment of FIG. 1, taken along line 2—2 in FIG. 1.

In the example shown in FIG. 1 and in greater detail in FIG. 2, the transparency is comprised of an outboard glass sheet 10, a plastic interlayer 11 which may be polyvinylbutyral as is commonly used for laminated windshields or other suitable interlayer material, and an inboard sheet of glass 12. An electroconductive coating 13 is preferably placed on a surface that is not exposed, most preferably on the inboard side of the outboard glass sheet 10. Various coatings may exhibit the combination of transparency and electroconductivity to serve as the heating element for a windsheld or the like, but a preferred coating is that disclosed in U.S. Pat. No. 4,610,771 (Gillery), the disclosure of which is hereby incorporated by reference. That coating comprises a film of silver between films of zinc stannate, each of which may be applied sequentially by magnetron sputtering. The silver acts as the conductive layer and the zinc stannate films serve to mask the reflectance of the silver. The coating exhibits appropriate resistivity for use as a heated windshield when the silver layer has a thickness of about 110 angstroms, for example.

An optional feature shown in FIG. 2 but omitted from the other figures for the sake of clarity is an opaque border 14 which may be ceramic enamel applied to the flat glass surface by silk screening and fired on during the heating of the sheet for bending or in a separate heating step. The opaque border serves to conceal attachment means and other elements when installed in a vehicle, and may also conceal the bus bars of the heating circuit.

With continued reference to FIGS. 1 and 2, a bottom bus bar 15 and top bus bar 16 are in contact with the coating 13. Line 17 (FIG. 1) indicates an edge of the coating 13 spaced from the sides and bottom edges of the transparency, leaving an uncoated margin along three sides thereof. The uncoated marginal areas may be craeted by masking those areas during the coating process. Optionally, the entire sheet could be coated and the coating subsequently deleted from those areas. the uncoated marginal areas permit connections to be made to the upper bus bar 16 without contact with the coating 13. As shown in FIG. 1, The electric power connection to the upper bus bar consists of conductive side extension strips 18 and 19 extending along opposite side edge portions and bottom extension strips 20 and 21. As shown in FIG. 1, the lower bus bar 15 and the upper bus bar extensions may terminate closely adjacent to each other at a terminal region 22 which, in the typical embodiment illustrated, is located at the center of the bottom edge of the transparency. A common terminal area for all of the circuit lines is preferred for the sake of convenient installation in a vehicle, but is not essential to all aspects of the present invention. It should also be apparent that the terminal region could be off-center or on other edge portions of the transparency.

Voltage sensor leads 23 and 24 are shown in FIG. 1 originating in the terminal region 22, extending parallel to the bottom extension strips 20 and 21 respectively into contact with the ends of the lower bus bar 15. Since the voltage sensor leads are not required to carry as much current as the bus bars, they may be considerably smaller in width than the bus bars, preferably consisting of fine lines.

The bus bars and the voltage sensor leads may conveniently consist of the same electroconductive material applied to the substrate in the same step. Suitable electroconductive bus bar materials are well known in the art, typically comprising a ceramic frit material containing a metal such as silver, which may be applied to the substrate in slurry form by silk screening in the desired pattern. The frit is then fused by heating, either in a separate step or as part of a bending operation, thereby fixing the electronconductive pattern onto the substrate. The conductivity of the bus bars is chosen to be considerably greater than that of the coating 13.

As shown in FIG. 1, a source of electrical power 25 may be connected to the bus bars by way of electrical leads 26 and 27 which contact the respective bus bars in the terminal region 22 of the transparency. A jumper lead 28 joins both extensions 20 and 21 of the upper bus bar in common to one pole of the power source.

Figure 3:
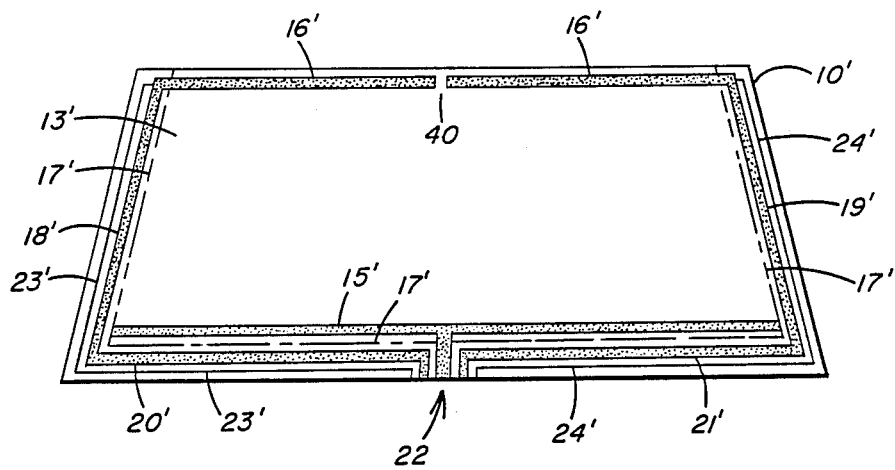
FIG. 3 is a schematic depiction of a heated transparency incorporating an alternative embodiment of the present invention involving an alternative location for voltage sensor leads.

The electroconductive coating 13 in the FIG. 1 embodiment is effectively divided into two separate circuits by a discontinuity in the upper bus bar 16, which may constitute a segment of increased resistance. The segment of increased resistance in FIG. 1 is provided by a notch 30 in the upper bus bar 16 wherein the reduced thickness of the bus bar remaining in that segment has substantially greater resistance than the remainder of the bus bar. To provide sufficient isolation between the two halves of the heating circuit on either side of the notch 30, the conductivity (and thus the width) in the notch portion is preferred to be no more than about 10 percent of that of the remainder of the bus bar. Providing a notch rather than a complete gap permits a small amount of current to flow from one side of the circuit to another to compensate for any minor imbalances that may be present, but prevents large amounts of current from flowing through the notch segment in the event of a break on one side. Therefore, a break on one side would result in a change in the resistance on that side which could be detected as a voltage difference. The separation provided by the notch 30 or other predetermined discontinuity is preferably located so as to divide the heated area into two regions having substantially equal resistance, and the preferred arrangement shown in the drawings is to provide the separation along the vertical center line of the windshield in the normal installed orientation. But unequal areas could be utilized if the voltage difference sensing circuit is calibrated appropriately. Using a complete gap in the upper bus bar as shown in FIG. 3 instead of the notch permits breaks to be detected with greater sensitivty. Another alternative with improved sensitivity is shown in FIG. 4, where a separation is provided between two areas of the coating 13.

Detecting a resistance imbalance between the two heated areas that evidences a break in the coating or one of the bus bar segments is accomplished by a comparator circuit 31, which may be a conventional balanced bridge type circuit. Voltage sensor leads 23 and 24 are connected to the comparator 31 by way of leads 32 and 33. The reference voltage is supplied to the comparator 31 by lead 34 from the power source lead 26. Voltage between leads 32 and 34 is compared to the voltage between leads 33 and 34. When one of these voltages changes relative to the other, it is evidence of a change in resistance in one side of the heating circuit caused by a malfunction, and an alarm signal is generated and may be transmitted via a lead 35 to a warning device or relay to shut off the electric power from the transparency. If the applied voltage varies, however, the voltage across both sids of the circuit changes together, and the comparator circuit does not generate an alarm signal.

Figure 4:
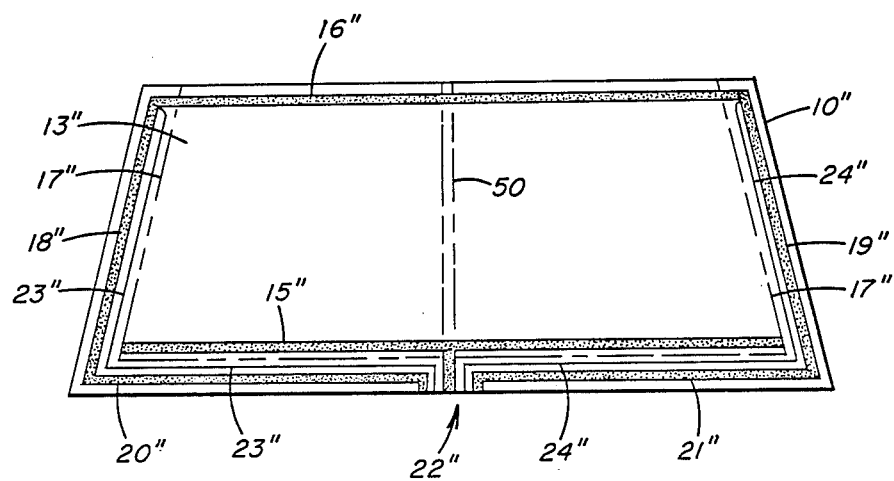
FIG. 4 is a schematic depiction of a heated transparency incorporating another alternative embodiment of the present invention that includes a partitioned electroconductive coating.

Elements of the embodiments of FIGS. 3 and 4 in common with the embodiment of FIG. 1 are given like reference numerals and their descriptions need not be repeated. The external circuitry may be essentially the same for all of the embodiments. As noted above, the transparency in FIG. 3 differs from that in FIG. 1 by the provision of a complete gap 40 in the upper bus bar 16'. Another difference is that voltage sensor leads 23' and 24' are in contact with the opposite ends of the upper bus bar 16'. In this embodiment the voltage sensor leads 23' and 24' extend along the opposite marginal side areas of the transparency outboard of the side extension strips 18' and 19'. Instead, the voltage sensor leads 23" and 24" could be located inside the side extension strips 18" and 19" as shown in FIG. 4. In the FIG. 3 arrangement, the reference voltage supplied to the comparator circuit would be in common with the power lead connected to the lower bus bar 15'.

In FIG. 4 separation between two areas of the coating 13" is provded by a center line 50. The center line 50 may be masked during coating to prevent deposition of the coating in that area or it may be created by deleting the coating in that area after the coating operation. the center line preferably defines two equal areas of the coating, but an asymmetrical pattern could be accommodated by calibrating the detection circuit. It is also preferred that the line 30 extends the entire distance between the upper and lower bus bars to completely isolate the two halves of the circuit, but a line extending less than the full distance may also be at least partially effective.

This description has been set forth with reference to particular embodiments for the sake of providing the best mode of practicing the invention, but it should be understood that variations and modifications known to those in the art may be resorted to without departing from the scope of the invention as defined by the claims that follow.

I claim:

1. An electrically heated transparency comprising: a transparent sheet, a transparent electroconductive coating on a major surface of the sheet, first and second bus bars in contact with the coating along opposite marginal edge portions of the transparency, a predetermined discontinuity in at least one of the bus bars establishing first and second circuit areas on the transparent sheet having separately measurable resistances, first and second voltage sensor leads within the transparency extending from a terminal region to separate portions of the bus bars so as to be associated with the first and second circuit areas respectively, whereby a change in resistance in one circuit area relative to the other circuit area may be detected.

2. The apparatus of claim 1 wherein the predetermined discontinuity in at least one of the bus bars comprises a segment of substantially reduced conductivity relative to the remainder of the bus bar.

3. The apparatus of claim 2 wherein the predetermined discontinuity is located in the vicinity of a center line of the transparency.

4. The apparatus of claim 2 wherein the predetermined discontinuity is a gap in one of the bus bars.

5. The apparatus of claim 4 wherein the gap is located in the vicinity of a center line of the transparency.

6. An electrically heated transparency system comprising: a transparent sheet, a transparent electroconductive coating on a major surface of the sheet in first and second coated areas having separately measurable resistances, means to supply electric current to both coated areas, and comparator circuit means connected to both areas for detecting a change in resistance of one area relative to the other area.

7. The system of claim 6 wherein the comparator circuit means is connected to at least one of the coating areas by means of voltage sensor leads within the transparency.

8. The system of claim 7 wherein the means to supply electric current to the coating areas includes two bus bars, at least one of which having a discontinuity providing separation of the coating areas.

* * * * *